March 18, 1958 H. M. JOSEPH ET AL 2,827,167
CURRENCY COUNTERS
Filed Jan. 21, 1952 6 Sheets-Sheet 1

INVENTOR.
Horace M. Joseph
Paul A. Selgin
Anton Soler
Carroll Stansbury

March 18, 1958   H. M. JOSEPH ET AL   2,827,167
CURRENCY COUNTERS
Filed Jan. 21, 1952   6 Sheets-Sheet 2
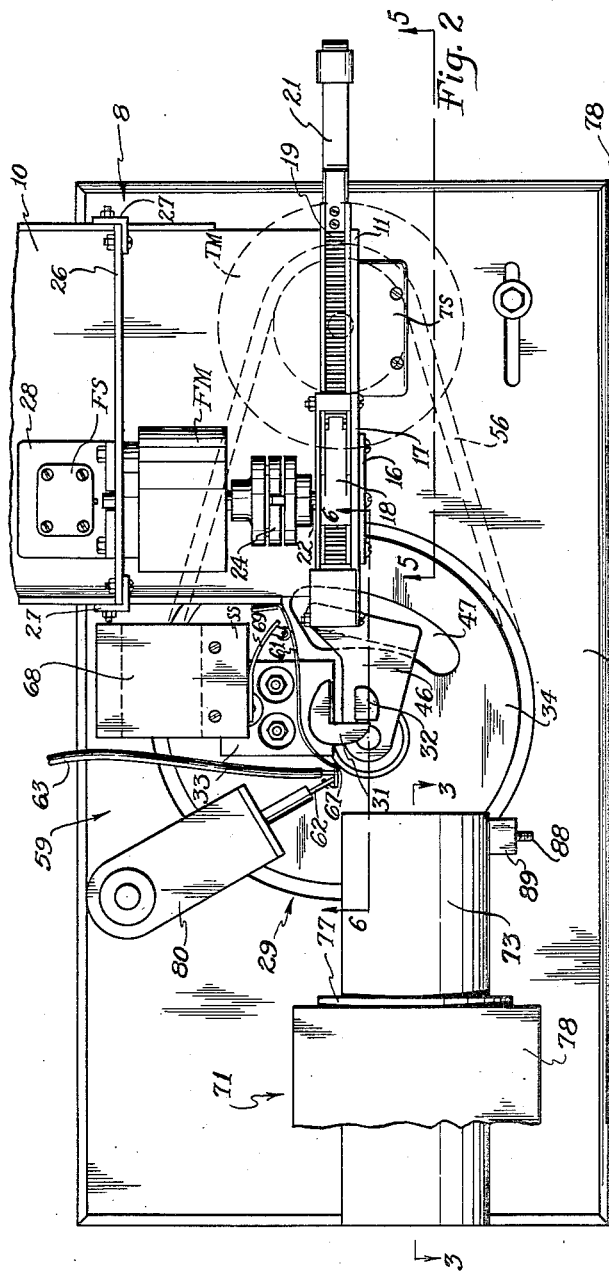
Fig. 2
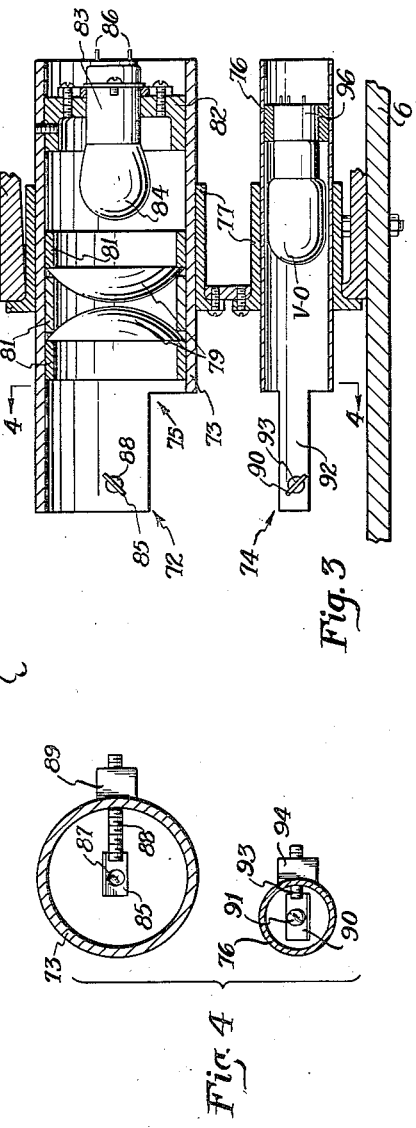
Fig. 3
Fig. 4
INVENTOR.
Horace M. Joseph
Paul Deli
Anton Soler
Carroll Stansbury March 18, 1958 H. M. JOSEPH ET AL 2,827,167
CURRENCY COUNTERS
Filed Jan. 21, 1952 6 Sheets-Sheet 4

INVENTOR
Horace M. Joseph
Paul A. Selgi
Anton Soler
Carroll Stansbury

March 18, 1958    H. M. JOSEPH ET AL    2,827,167
CURRENCY COUNTERS
Filed Jan. 21, 1952    6 Sheets-Sheet 5

2,827,167

CURRENCY COUNTERS

Horace M. Joseph, Kensington, Md., Paul J. Selgin, Washington, D. C., and Anton Soler, Chevy Chase, and Carroll Stansbury, Bethesda, Md., assignors to the United States of America as represented by the Secretary of Commerce Application January 21, 1952, Serial No. 267,492

13 Claims. (Cl. 209—111)

(Granted under Title 35, U. S. Code (1952), sec. 266)

The invention described herein may be manufactured and used by or for the Government of the United States for governmental purposes without the payment to us of any royalty thereon in accordance with the provisions of the act of March 3, 1883, as amended (45 Stat. 467; 35 U. S. C. 45).

This invention relates to the development of a machine for the electronic counting of old currency, or any other slips of sheet material having similar characteristics.

Replacement of worn-out bank notes by new ones involves the redemption of some 8 tons of currency, about 5 million dollars' worth, daily. Although new paper money has been machine counted for many years, it is not possible to use these same machines for counting old currency because of the way in which these machines operate. In general most of the prior art machines operate on the same basic principle, to wit, each note to be counted is picked up separately and fed through a slot which is just large enough to pass a single bill at a time. This system requires that the currency have an almost perfectly straight edge so that it can be fed into the slot, and also the note has to be fairly stiff. If the bill droops during the feeding operation the end of the bill cannot be lined up with the slot. As a result of these limitations it is readily apparent that the prior art machines are not capable of handling old bills which are usually crumpled and limp and often have torn edges. Therefore, up until the present time it has been necessary to count old currency by hand.

In preparing money for return to the Treasury Department the Federal Reserve Banks make up packets of 100 notes called "straps" cut longiutdinally into half-notes. As pointed out above, these bills are limp, wrinkled, and difficult to handle. These and similar problems have meant that the condition of the returned money is variable, and tedious counting by hand has been necessary.

It is therefore the primary object of this invention to provide a machine which is capable of counting old currency or other pieces of paper of similar physical characteristics.

Another object is to provide a machine that will rapidly and accurately count crumpled and limp bills.

Another object is to provide a comparatively cheap machine for counting old currency, which is equally capable of counting new currency or any other slips of sheet material having similar characteristics.

In accordance with the present invention there is provided a machine which will meet the requirements as set out above. Straps of old currency are fed one at a time into a pair of jaws. The jaws clamp the strap and then the jaws are rotated. A strip of metal is so located with respect to the jaws that as they turn, the metal strip causes the strap to be wound around the jaws. One end of the strap is held rigidly in the jaws while the other end is free. This condition plus the wrapping of the strap of bills around the spindle causes the free ends to be offset stepwise. The metal strip that causes the bills to wrap around the jaws is terminated in a knife-edge. The rotation of the free ends past the knife edge causes these bills to be riffled. As each bill leaves the knife edge it is caught in a stream of air and is blown quickly through a phototube light beam system. The resulting current pulses are applied to an electronic counter which acutates control circuits. If the correct number of bills is present the strap is sent down one chute but if an incorrect number is present the strap is sent down another ("Reject") chute.

Other uses and advantages of the invention will become apparent upon reference to the specification and drawings.

Figure 2 is a plan view of the feeding and counting mechanism located on the top of box 6.

Figure 3 is a cross-sectional view taken along line 3—3 of Figure 2.

Figure 4 is a cross-sectional view taken along line 4—4 of Figure 3.

Figure 5:
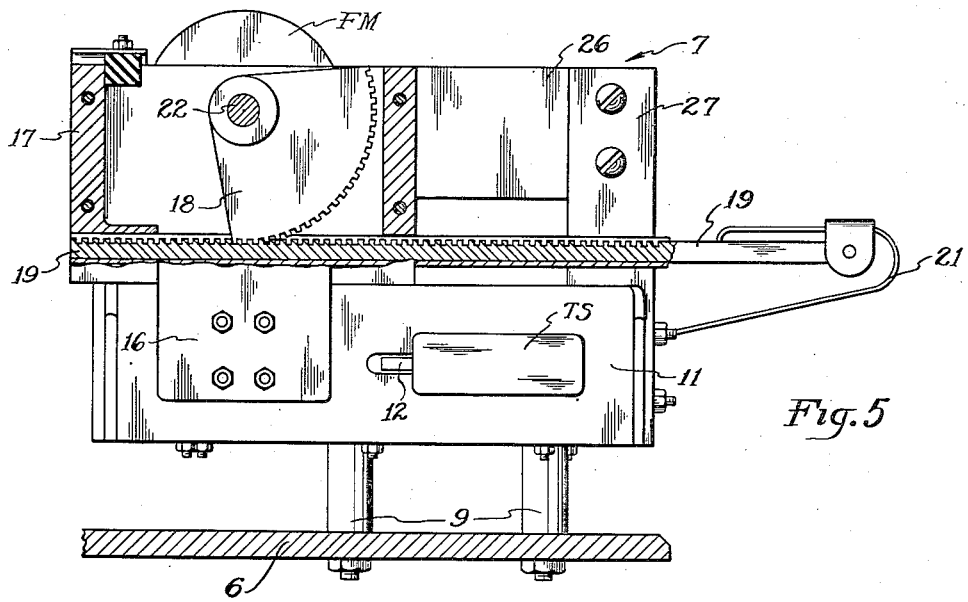
Figure 5 is an elevation partly in section of the feeding mechanism taken along section line 5—5 of Figure 2.
Figure 6:
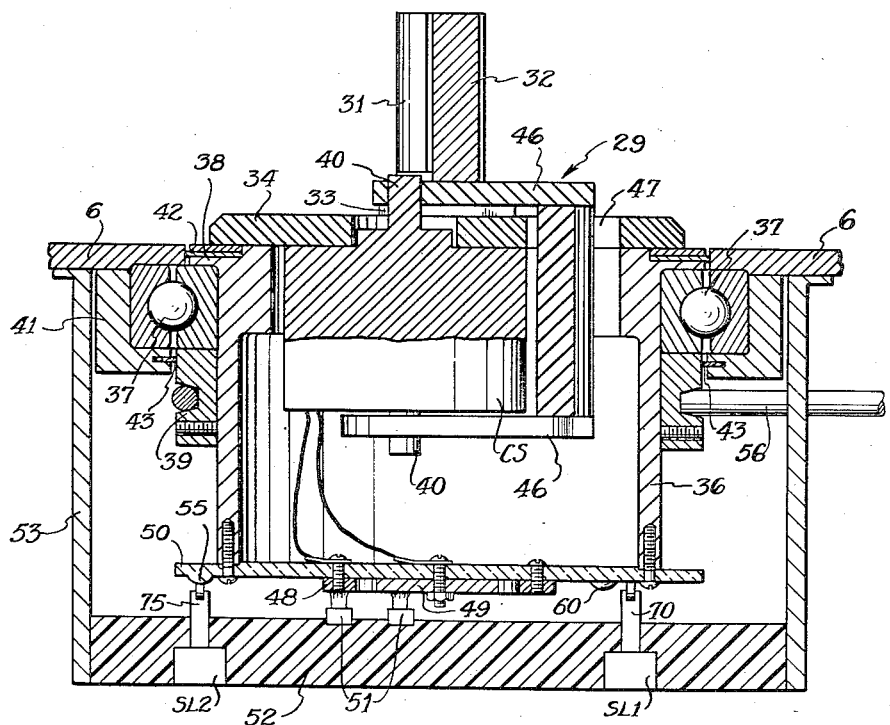
Figure 6 is a partial vertical cross section of the jaw and turntable mechanism taken along line 6—6 of Figure 2.
Figure 7:
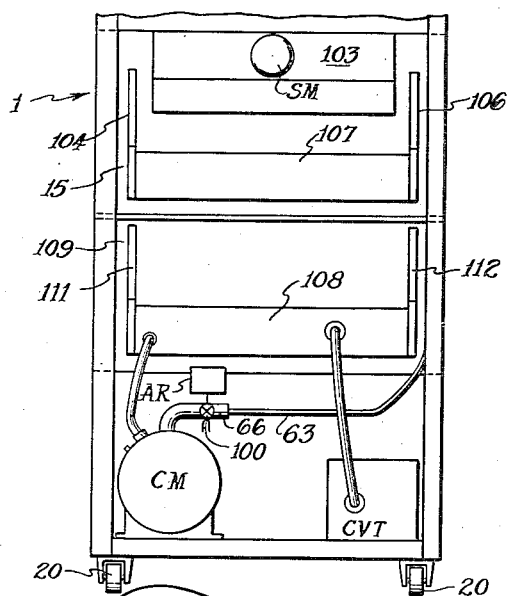
Figure 7 is a rear view of the inside of the machine.
Figure 8:
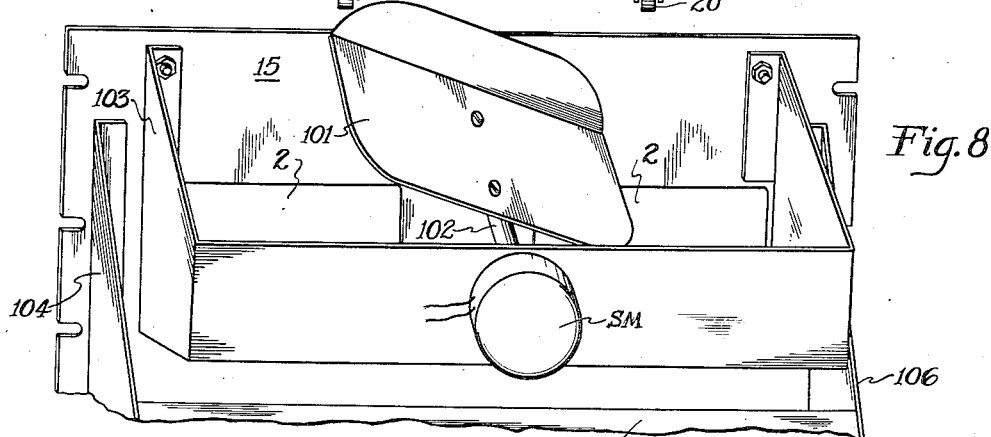
Figure 8 is a perspective view of the indicator mechanism.

Referring to the drawings and particularly to Figs. 1–8 there is shown a machine representing one embodiment of the present invention having a vertically arranged housing 1 with two removable front panels 15 and 109 and removable back panels (not shown) said machine being supported on four rollers 20, two of which appear in Fig. 7. A partial rear view of the removable front panel 15 is shown in Fig. 8. In the front panel 15 are openings 2—2 for a "reject" chute 3 and a "correct" chute 4. Supported on the top of the machine is a box 6 upon which are mounted feeding and counting mechanisms. The box 6 has trapezoidal sides with the front leg of the trapezoid shorter than the back leg so that the top of the box is inclined from the back toward the front to provide for gravitational feed of straps to a feeder mechanism 8. This type of feeding is aided by placing a cylindrical weight 5 behind the straps. Also located in the top of the machine is a bin or hopper 7 through which the straps of bills are dropped after counting. At the right rear of the top surface of the box 6 is located the feeding mechanism 8. This is clearly shown in Fig. 2 which is a view of the top of the box 6. The entire mechanism is raised above the top surface of box 6 on legs 9 as shown in Fig. 5. A loading trough 10 is supported on the legs 9 and a plate 11 is fastened to the front of the trough. The next strap to be fed rests against the back of the plate 11. Bolted to the plate 11 is a strap switch TS having an arm 12 which extends through plate 11 and is actuated by the straps. Also mounted on plate 11 (see Figs. 2 and 5) is a support 16 for gear box 17. Mounted in the gear box is a sector gear 18 and a rack gear 19. Mounted on the outer end of the rack gear is a strap pusher 21. It will be noted that the gear box and therefore the rack gear are located directly over the strap to be fed to the machine. The sector gear is fastened to a shaft 22 which is coupled to a rotary feeder solenoid FM through a flexible coupling 24. The flexible coupling takes up the linear motion of the armature of the solenoid FM but transmits the rotary motion to the sector gear 18.

The solenoid FM is of a type that has both a linear and a rotary motion. The armature of the solenoid is threaded to the casing and therefore when the armature is pulled toward the field poles it rotates as it advances. The solenoids FM are of the type manufactured by G. H. Leland, Incorporated, and are identified as basic design No. BD7ES. The solenoid is supported by a metal bar 26 which is held by vertical braces 27 which are in turn fastened to the trough 10. A plate 28 on which is mounted a feeder switch FS is also supported by the bar 26.

Just to the left of the feeding mechanism is a jaw and rotating assembly 29 which is also mounted on the top of the box 6. The jaws are made in two parts, a stationary portion 31 and a movable portion 32. The stationary part 31 of the jaw is a vertical extension of a metal plate 33 which is bolted to a disc 34 (Fig. 6). The disc 34 is fastened to a hollow cylinder 36, which in turn is rotatably mounted in the top of the box 6. The rotatable mounting is obtained by means of a bearing 37. The inner race of the bearing is held between a shoulder 38 of the hollow cylinder and the top of a belt wheel 39. An outer race is held between the top of the box 6 and an L-shaped metal ring 41 which is fastened to the underside of the top of the box 6. The bearing is protected from dust and dirt by means of felt washers 42 and 43.

Mounted on the bottom of the disc 34 is a clamp solenoid CS, a rotating shaft 40 of which extends through the disc 34 and is fixed to a horizontally disposed U-shaped arm 46, the upper leg of which extends through the disc 34 and the lower leg of which is fastened to the other end of the shaft 40 of the clamp solenoid CS. The movable part of the jaw is a vertical extension of the U-shaped arm 46. An opening 47 is provided in the disc 34 to permit the U-shaped arm to pass through the disc. The opening is made large enough to permit a movement of the arm 46 that will be sufficient to rotate the part 32 of the jaw from the unclamped to the clamped position.

The jaws will be open when the arm 46 is rotated toward the lower left of the drawing shown in Fig. 2. The closed position is as shown with the arm rotated toward the upper right of Fig. 2.

The power for the solenoid CS is brought in on slip rings 48 and 49 which are mounted on an insulating disc 50. This disc is in turn fastened to the bottom of the hollow cylinder 36.

Brushes 51 which are bolted to a bar 52 carry current to the slip rings. The bar 52 which is mounted on supports 53 also carries limit switches SL1 and SL2. The supports 53 are fastened to the underside of the top of the box 6. The switches SL1 and SL2 are actuated by means of cams 55 and 60 which are raised portions of the insulating disc 50. These cams contact reciprocable arms 70 and 75, which arms are normally spring-pressed against the bottom of the disc 50, and force the arms downward thereby actuating the switches.

The rotation of the entire assembly 29 is accomplished by means of a turntable motor TM which drives a belt 56. The belt drives the belt wheel 39, which as explained before is fastened to the hollow cylinder 36. The motor TM is mounted on the underside of the top of the box 6.

Located just behind the assembly 29 and on the top of the box 6 is a friction band and snarl switch assembly 59. One end of a friction band 61 (see Figs. 9 and 2) is fastened to the edge of the feeding trough 10. The band extends in a curved plane from the feeding trough to a point just beyond the jaws 31 and 32 at which point the band is almost perpendicular to the front plane of the machine. At this point a piece of metal 67A is fastened to the band at right angles to the band thereby forming a knife edge 67. The piece of metal 67A continues a short distance past the knife edge and is held tightly against the strap by a rod 62. The rod is mounted in a box 80, which is fastened to the top of box 6 in such a manner as to allow the rod to move back and forth in its mount for reasons to be explained further on in the specification. Also attached to the friction band 61 just to the right of the rod 62 is an air hose 63. A hole is drilled in the face of the band to permit a stream of air to pass through the band. The other end of the hose is connected to an air compressor CM through a valve 66 (Fig. 7).

Located behind the friction band is a snarl switch SS. The switch is mounted in a support 68 which is fastened to the top of the box 6. The switch is activated by means of a switch arm 69 which under certain circumstances is contacted by the friction band 61.

Located directly to the right of the jaws on top of box 6 is an optical system 71. The system consists of an exciter lamp assembly 72 mounted in a large tube 73 and a phototube assembly 74 mounted in a small tube 76, both being supported by a bracket 77 and being enclosed in a box 78 (Figs. 3 and 4).

Figure 11:
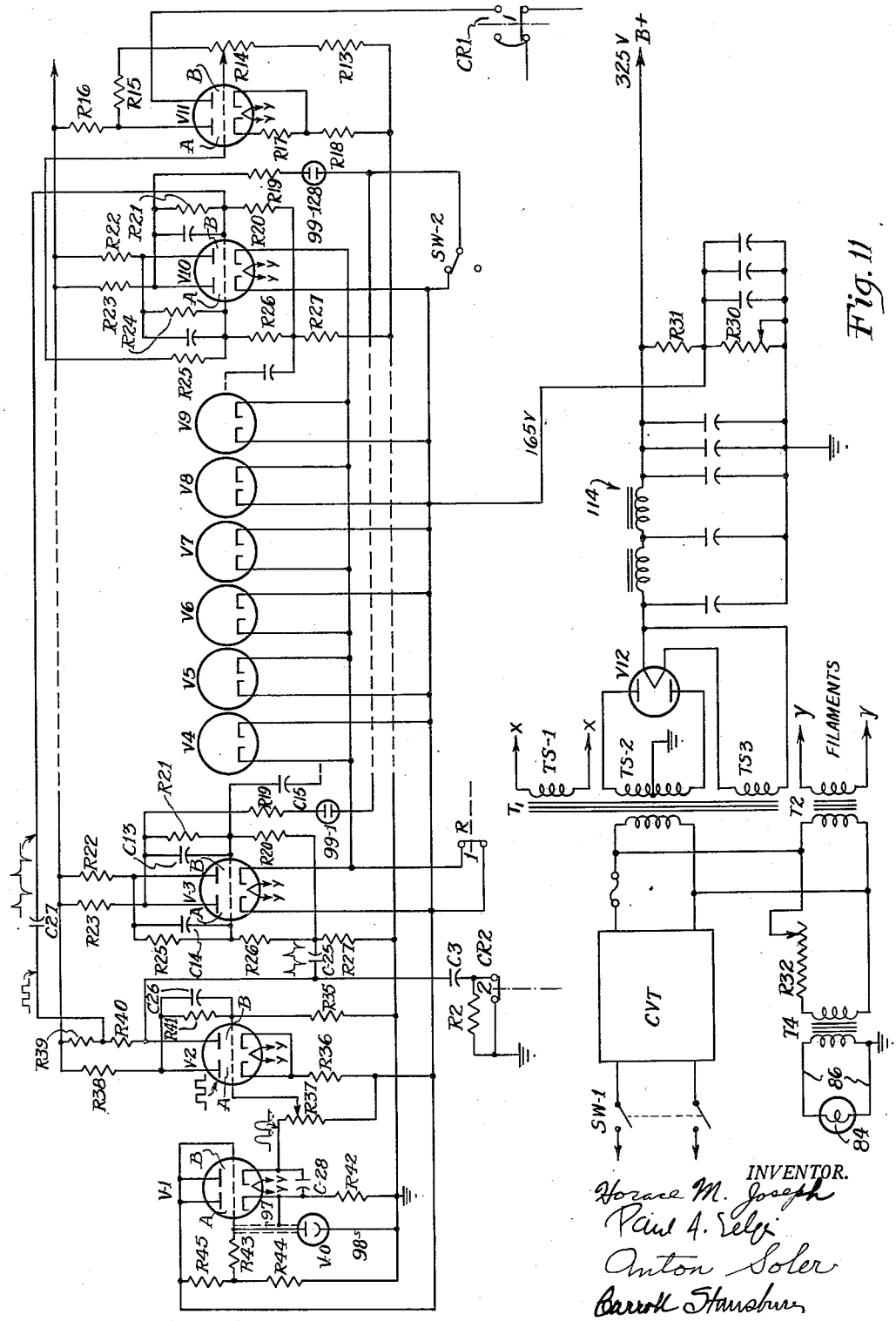
Figure 11 is a circuit diagram of the direct-current power supply, the phototube circuit, the trigger circuit, and the binary counter.

Mounted in the large tube 73 are lenses 79—79 and brass spacers 81. A bracket 82 is held to the tube 73 by means of screws. An exciter lamp socket 83 is supported in this bracket and an exciter lamp 84 is screwed or plugged into the socket. Power is supplied to the lamp over wires 86. The lenses 79—79 and a mirror 87 are so arranged that the diameter of the beam of light from the lamp 84 is approximately equal to the diameter of the mirror. The mirror is cemented to a plate 85 which in turn is held by a screw 88. The screw is supported in a nut 89. The nut is welded to the side of the tube 73. This allows for adjustment of the mirror by simply turning the screw 88. The mirror 87 is located in the tube 73 at a point above a cut-away portion 75 of the tube. This allows the light beam to be deflected downward and onto the face of a mirror 91 which is cemented to a plate 90 which in turn is fastened to an arm 92 by means of a screw 93 and a nut 94. The arm 92 is mounted to the side of the tube 76 that is located toward the front of the machine. A phototube V–0 plugs into a tube base 96 and is connected to a tube V–1 by a shielded lead 97 and a lead 98, as shown in Fig. 11.

As shown in Figs. 3 and 4, the tubes 73 and 76 are offset with respect to each other with respect to a plane taken perpendicular to the top of the box 6. This is for the following reason: During the counting operation the bills to be counted pass between the cut-away portion of the tube 73 and the arm 92. The passage of the bills breaks the beam of light between the mirrors 87 and 91. If the tubes 73 and 76 were located in the same plane perpendicular to the top of the box 6, the beam of light would be parallel to the thickness of the bill. As a result the beam would not be completely interrupted, since the thickness of the bill is smaller than the diameter of the beam and a pulse consequent thereto, as will be described, would be so small and of such a short duration that the counter might not be actuated. To eliminate this difficulty the lower tube is located toward the front of the machine with respect to a plane which is perpendicular to the top of the box 6 and which passes through the longitudinal axis of the tube 73. In this way the beam of light between the mirrors 87 and 91 will be totally interrupted by the orthogonal projection of the width of the bill on a plane which is perpendicular to the beam of light. With this construction the beam of light is completely interrupted for at least an instant and the above-mentioned difficulty is obviated.

The control switches for the currency counter are located on the front of the machine. At the upper left are an on-off switch SW–1 and an automatic-manual switch AM. At the upper right are a ready push-button RB, a stop push-button SB, and a manual start button MS. Located just below the chutes 3 and 4 are indicator lights 99 forming part of a binary counter to be described.

Figure 1:
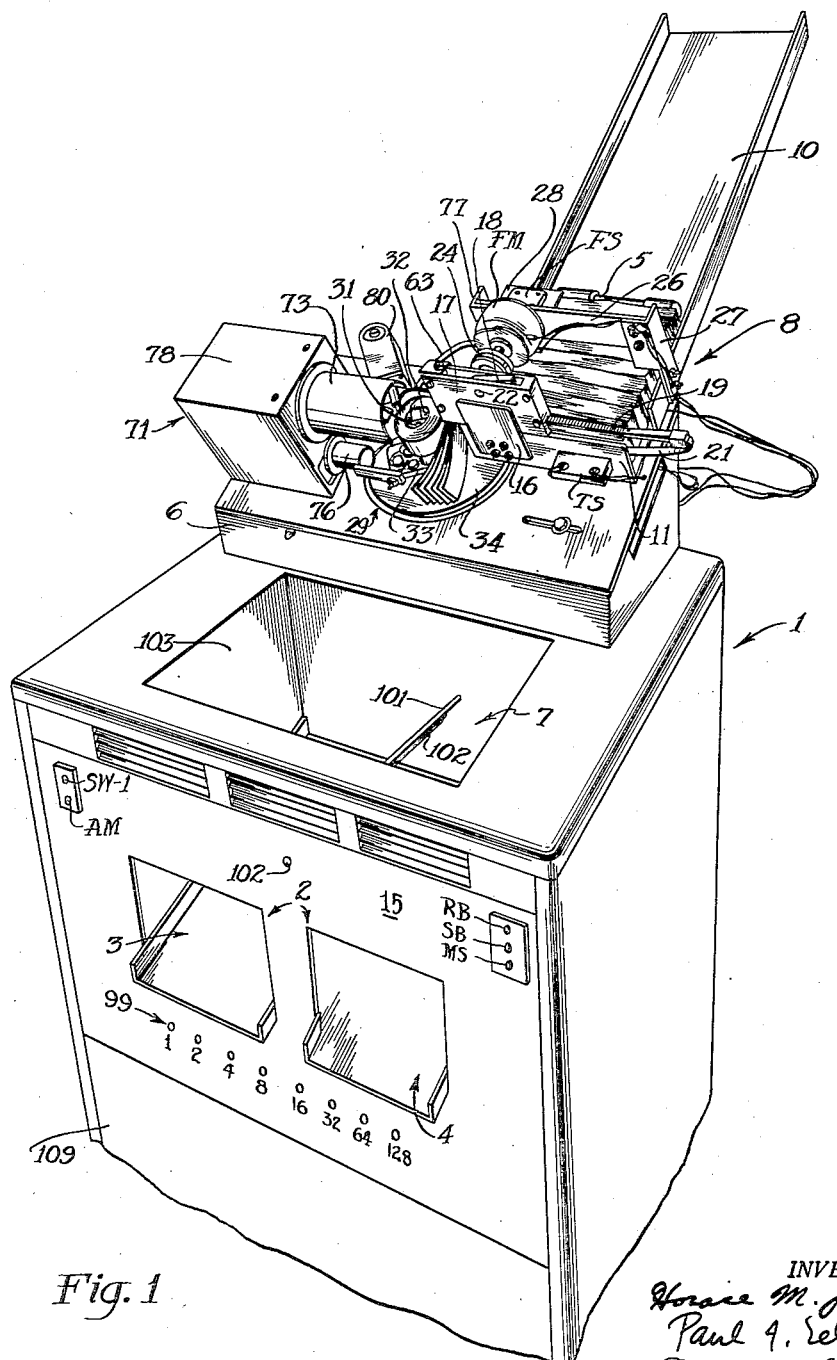
Figure 1 is a perspective view of the upper portion of the machine.

Located in the bin or hopper 7 in the top of the cabinet 1 is an indicator vane 101. This vane is supported on a shaft 102 (Fig. 8) which is journaled in the front panel 15 (Fig. 1) and in the rear portion of a frame 103. The frame 103 is fastened to the rear of the front panel 15 of the machine 1. The shaft of a sorting solenoid SM which controls the position of the vane is fastened to the end of shaft 102. The relay is fastened to the frame 103. The bottom of the frame 103 is formed into the chutes 3 and 4 as shown in Fig. 1.

Figure 12:
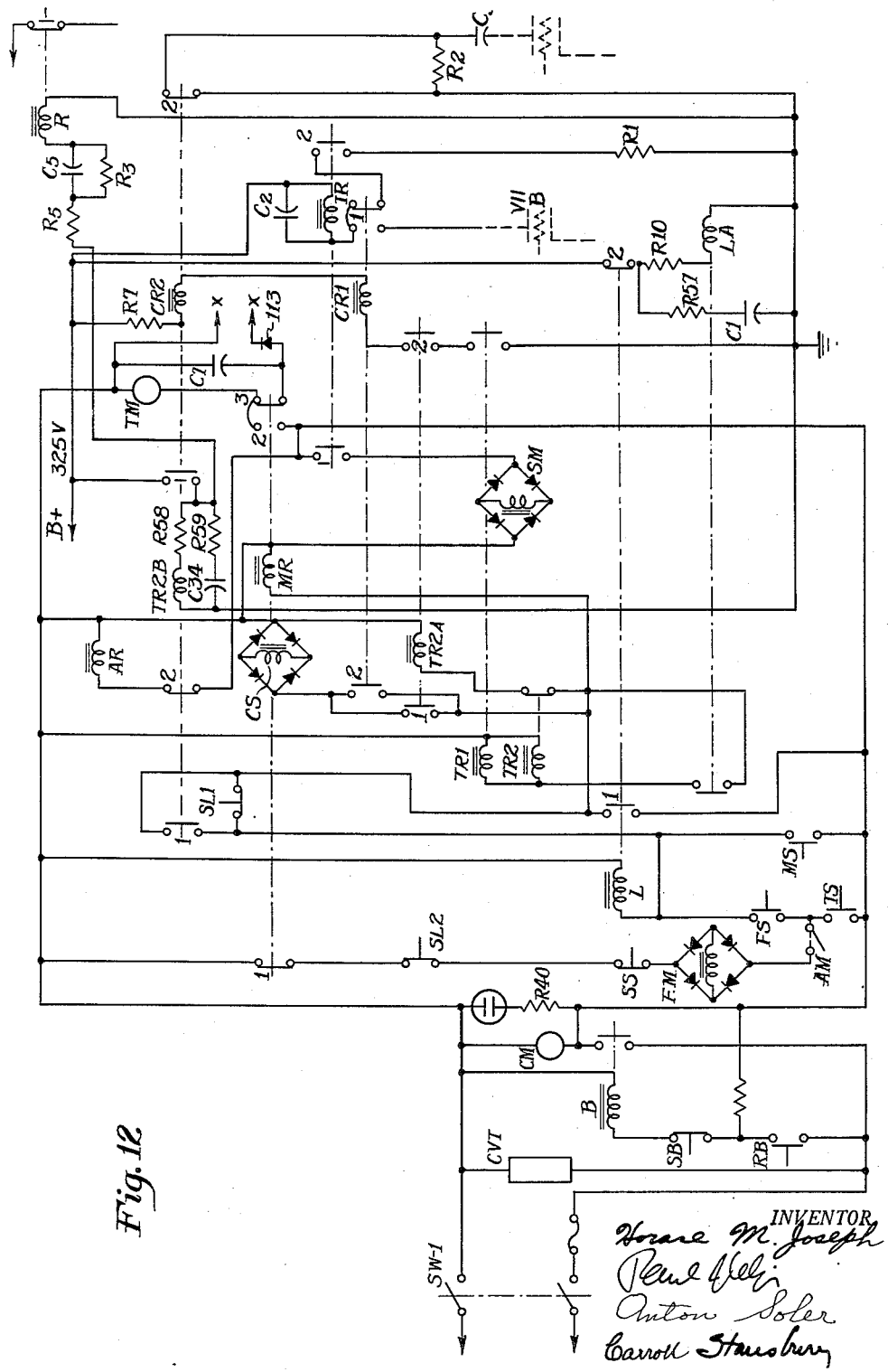
Figure 12 is a circuit diagram of the electrical control system.

Arms 104 and 106 which are also fastened to the rear of the panel 15 support a chassis 107. This is also shown in Fig. 7. A chassis 108 is fastened to the rear of the panel 109 by means of arms 111 and 112. The chassis 107 carries the electronic circuits, a reset relay R, a counter relay CR2, an indicator relay IR, a timing relay TR2B and an on-off switch for the neon lights SW-2, all shown in the wiring diagram in Fig. 12.

The lower chassis 108 carries a D. C. power supply, control relays B, LA, and L; timing relays TR1, TR2; a motor relay MR; a counter relay CR1, and an exciter lamp rheostat R32.

In the bottom of the counter housing 1 is located an air compressor unit CM. An air escape valve 66 is located in the line to a hose 63. The valve is controlled by a relay AR. When the relay is energized the valve 66 is positioned so that the compressed air is allowed to escape through a tube 100. When the relay is deenergized the valve 66 is positioned so that the compressed air is directed through the hose 63. Also located in the bottom of the housing is a constant voltage transformer CVT which is used to maintain the voltage input to the control and electronic circuits at a constant magnitude.

*Mechanical operation of the counter*

The mechanical operation of the machine is explained below. The operation of the electronic and control circuits will be explained further on in the specification.

With straps in the chute 10, the strap switch TS is closed and with the on-off switch SW turned on, and the switch AM turned to automatic, the machine is ready to operate. A counting cycle is initiated by pushing the push-button RB. The rotary feeder solenoid FM is actuated. This rotates the sector gear 18 which advances the rack gear 19 toward the left. Arm 21 which is carried on gear 19 pushes one strap toward the jaws 31 and 32. The rotary feeder solenoid is so made that as it rotates it also has a linear motion toward the rear. This actuates the feeder switch FS for reasons to be explained later. When the strap has been presented to the jaws, the jaws are clamped by rotation of the clamp solenoid CS and the feeder mechanism returns to its inoperative position as will be explained in detail below. The turntable motor TM is energized and begins to rotate the rotating assembly 29. During the first rotation of the turntable the strap is wrapped around the jaws into a nearly circular roll by being pressed against the friction band. The normal space between the jaws and the friction band is not large enough to accommodate the wrapped strap and therefore the friction band is forced toward the rear of the machine. This movement is possible because of the manner in which the rod 62 is mounted. In this position the band contacts the snarl switch arm 69 and opens the snarl switch SS for reasons to be explained later. Also during the first revolution the air escape valve is closed and a stream of air is emitted from the air hose through the hole in the friction band. It should be remembered that during each revolution the limit switches SL1 and SL2 are activated when the cams 55 and 60 contact the arms 70 and 75. The reasons for this will be explained further on in the specification.

As the turntable rotates further the notes are riffled; that is, the end of each note is released individually by moving it past the knife edge. As the ends of the notes pass the knife edge they are caught in the air stream and blown into the space provided between the tubes 73 and 76.

The air stream is an important part of the invention and serves several purposes. Often adjacent bills tend to stick together and if this condition were not corrected two or more bills might pass through the light beam at the same time, thereby causing an incorrect count. The pressure of the air stream tends to separate the bill just released from the unreleased bills and therefore prevents such ambiguity. Another situation which the air stream remedies is one that is attributable to the worn condition of the bills to be counted. By the time these notes are returned to the Treasury they have lost most of their elasticity. As a result, when the bills are released by the knife edge they do not fly out into the beam of light but instead tend to remain in the rolled position around the jaws. Consequently the bill may not intercept the light beam or, if it does, it intercepts such a small portion of the beam that the counter is not actuated. If the counter were made sensitive enough to detect such small interruptions of the light beam, it would also be actuated by bits of stray paper in the beam. These stray pieces of paper are always present because the knife edge tears off small pieces of paper as the bills are riffled. Therefore in order to insure that the counter will distinguish between a bill and stray bits of paper, it is necessary to provide an air stream which blows the bill out straight and through a large portion of the beam. Another reason for using the air stream is to blow away stray bits of paper which otherwise might get into the operating mechanism and cause improper operation of the mechanical parts.

As each note passes between the tubes the beam of light is broken and the binary counter is actuated. The count is registered by the indicator bulbs 99 in a manner to be explained later. The count is completed by the end of the second revolution at which time the clamp solenoid CS is deenergized and the jaws are opened. During the third revolution the strap drops into the hopper 7 because of gravity and is directed by means of the vane 101 into the proper chute depending upon whether the count was correct or incorrect. Ordinarily the vane is tilted to drop the strap into the "reject" chute 3. With the vane in this position the sorter solenoid SM is inactivated. If the count is correct the sorter solenoid SM is activated and the chute is rotated clockwise approximately 90 degrees. In this position the vane will direct the strap into the "correct" chute 4.

If another strap is in the feeder chute it will now be fed to the jaws and the entire cycle will be repeated.

The snarl switch SS is in the feeder circuit and prevents a new strap from being fed to the jaws if the old strap has not been released. If the old strap has not been released, the friction band will remain in contact with the arm of the switch SS holding the contacts of the switch open. This prevents the feeder mechanism from operating.

The D. C. power supply is shown at the bottom of Fig. 11. The 115-volt alternating current is fed to a transformer T-1 through a constant voltage transformer CVT. A transformer secondary TS1 supplies braking voltage to the turntable motor TM through a rectifier 113 shown in Fig. 12. Alternating current is fed to a rectifier V-12 through secondaries TS2 and TS3. Tube V-12 rectifies the current and the pulsating direct current is smoothed in a filter circuit 114. A divider network composed of resistors R30 and R31 divides the voltage, producing outputs of 325 and 165 volts.

Transformers T-2 and T-4 are also connected to the constant voltage transformer. The exciter lamp 84 (see Figs. 3 and 11) is connected across the secondary of the transformer T-4. A potentiometer R32 is connected in series with the primary of T-4 to provide for control of the intensity of the light emitted from the source 84.

A transformer T-2 supplies filament current for the tubes in the electronic circuit.

*Operation of the electronic circuit*

The electronic circuit of the currency counter is shown by a schematic drawing in Fig. 11. In this discussion, the circuit is divided into the following sections: Phototube and cathode follower circuit, trigger circuit, binary counter stages, and indicator circuit. Under normal operation conditions, the exciter lamp 84 illuminates the phototube, V-0. The illumination causes a current through phototube V-0 and a comparatively large voltage drop across resistor R43, which is in the grid circuit of the left-hand portion A of tube V-1. When a bill interrupts the beam of light from lamp 84, the current through phototube V-0 ceases momentarily. The voltage drop in resistor R43 is then reduced to zero. The potential of the phototube anode and the A grid of tube V-1 connected to it now rises in a positive direction to the value supplied by a voltage divider consisting of resistors R44 and R45. By the action of the A triode of V-1 which is a cathode follower, very nearly this same rise in voltage occurs at the A cathode of tube V-1 and appears across resistor R42. However, the power level of the signal is very much increased since (nearly) the same change in voltage appears across the much lower resistance of resistor R42 as compared to the high value of resistor R43. This change produces a flow of charging current out of a coupling capacitor C28 through a potentiometer R37 causing a voltage drop. (This current will cease to flow when C28 is fully charged.) A fraction of the voltage thus developed across resistor R37, as determined by the position of the potentiometer arm, is applied to the trigger circuit.

When the light beam is restored, the potential of the A cathode of tube V-1 drops, and by reason of the discharge current of the coupling capacitor C28, the voltage at the cathode of the B half of tube V-1 would tend to go negative. However, the B half of V-1 is connected as a rectifier, and short-circuits the negative current. Because of this action the circuit is restored immediately after the bill has passed and is ready to supply another positive voltage to the trigger circuit.

As the bills pass through the light beam, a sequence of positive pulses appears at the grid of the A half of tube V-2 from the cathode follower circuit. The trigger circuit, including tube V-2 and its associated components, acts as an electronic switch which is turned on by each pulse and turned off again at the end of the pulse. The output from this circuit, a series of steep-sided rectangular pulses, is applied to a capacitor C25 and thence to the first stage of the binary counter. A part of the output is also applied through a capacitor C27 to the grid of tube V-10, for reasons which will be explained later. The trigger action is accomplished by a Schmitt-type circuit (during the counting period when the contacts 2 of relay CR2 are open) as follows:

Before a pulse arrives from the cathode follower, the A half of tube V-2 is in cut-off condition and not conducting current. The B half is conducting. When the large positive pulse arrives, via potentiometer R37, at the grid of the A half, the current begins to flow when the resistor voltage rises above the cut-off point. As the current flows through the A half, the potential at the anode drops as a result of the current flow through resistor R38. Because resistor R38 on the anode side of the A half of tube V-2 has a higher ohmic value than resistor R36 in the cathode circuit of this section of the tube the voltage drop across resistor R38 is larger than the small rise across resistor R36. This drop in voltage is applied to the grid of the B half of tube V-2 through a capacitor C26 and resistor R41 and causes the current in the B half to decrease. As a result of the diminished current in the B half, the voltage of the two cathodes is reduced. The drop causes an increase in the current in the A half of the tube and therefore a greater drop in its anode voltage, which in turn is applied to the grid of the B half. This cumulative process occurs with great rapidity until the B half of the tube is in a cut-off state. As the current in the B half is in a cut-off state, the voltage drop across resistors R39 and R40 rapidly goes to zero and hence the voltage of the anode of the B half rapidly rises to that of the supply voltage.

When the input voltage at the grid of the A half drops to zero (at the end of the passage of the bill), a similar cumulative process restores the initial conditions of V-2. The result at the anode of the B half of V-2 is a steep-sided rectangular pulse which is delivered to capacitors C27 and C25. The pulses fed to capacitor C25 are differentiated by the action of capacitor C25 and resistor R27 which are located in the grid circuit of the A section of a tube V-3, which is the first stage of the binary counter. Differentiation of the output of tube V-2 produces a short positive pulse at the beginning of the time the half note interrupts the light beam, and a short negative pulse when the light beam is restored. It is in this manner that the short-duration pulses needed to operate the binary stages are supplied.

In order to have the binary stage operate only during the passage of the bills through the light, the contacts 2 of relay CR2 are closed after the count is terminated as is explained below. This has the effect of connecting one terminal of capacitor C3 to the ground, thereby short-circuiting the pulses from tube V-2. During the counting cycle, resistor R2 is connected as a load in the plate circuit A of the B section of tube V-2 through C3. This, added load, however, has negligible effect upon the shape or amplitude of the output pulses.

The input signal from the trigger circuit to the binary counter appears across R27 as a succession of positive and negative pulses. Only the negative pulses produce counting action in this stage. A negative pulse is applied to the succeeding binary stage for every two negative input pulses applied to the first binary stage. These Eccles-Jordan flip-flop circuits operate in the following manner:

Tube V-3 is ordinarily set so that at the beginning of the count the A half is conducting current and the B half is in a cut-off state. When a positive pulse appears across resistor R27, the potential on both A and B grids rises. The rise in potential on the A grid tends to increase the current in this half, and has little effect since the tube is already conducting. The rise in potential of the B grid is limited by the current in the A grid that is drawn through resistors R26 and R27. The B grid remains below the cut-off value and the B half remains in a cut-off state. As a result, nothing occurs when positive pulses are applied to the binary.

When a negative pulse is applied, the A and B grids drop in potential. Nothing occurs in the B half since it is already in a cut-off state. However, the voltage applied to the A grid reduces the current in the A triode. The reduction in the current lessen the voltage drop across resistor R23, and hence the anode potential of the A half rises, a change that is transmitted to the grid of the B half through capacitor C13 and resistor R21. This change produces a rise in the potential of the B grid which is greater than the cut-off voltage (because of the amplifying action of the A section). As the B half is now conducting current, a voltage drop occurs across resistor R22. This voltage drop is coupled to the A grid by means of capacitor C14 and resistor R25 thereby reducing the potential of the B anode. The drop at the A grid causes the current in the A half to diminish further, and the action continues until the A section is in a cut-off condition and the B section is conducting. Since no current is passing through the A half, the potential at the A anode rises nearly to the supply voltage.

This voltage rise causes a neon-lamp indicator 99-1 to glow as an indication of this occurrence. The voltage rise also produces a corresponding rise in the B grid potential which is coupled to a tube V-4 of the next binary stage through a capacitor C15. Because of the rapid charging of capacitor C15 through the resistor corresponding to R27 in the next binary stage, a sharp positive pulse occurs across the latter, and has no effect on the next binary.

A second positive pulse, as a result of the second bill appearing in the light beam, is applied to resistor R27 by the trigger circuit through capacitor C25. This positive pulse has no effect on the circuit as indicated previously. The subsequent negative pulse now has a similar effect as the previous negative pulse except that the B half is the conducting triode and the A half is in a cut-off position. The result is again to interchange the conducting and cut-off positions. The anode potential of the A section drops as the A section conducts, thereby extinguishing the neon lamp 99-1. The voltage drop across resistor R23 is coupled to the tube V-4 next binary stage through capacitor C15, and this negative pulse makes it respond in the same way as the first binary stage.

It will be noted that it required the passage of two bills through the light beam to produce one drop in voltage across capacitor C15; that is, the passage of each bill through the light beam results in the output of a positive and negative pulse by the trigger circuit, but two negative pulses from the trigger circuit are required to produce a single negative output pulse from the first binary stage. As discussed in explaining the previous binary stage, the positive pulse has no effect, while the negative one interchanges the conducting and cut-off positions. Tube V-4 also goes through its cycle with two incoming negative pulses producing one negative output pulse. Hence, it takes four negative pulses applied to the input of tube V-3 to produce one negative output pulse of tube V-4. Similarly, it take 8 negative input pulses to produce a similar cycle in tube V-5, 16 negative pulses to produce this effect in tube V-6, 32 for tube V-7, 64 for tube V-8, and 128 for tube V-9.

As will be shown in the section on the indicator circuit, it is desired that the condition of the tube V-10 in the last binary stage, be such that the A half is in a cut-off condition (neon indicator lamp 99-128 lit) when the count is correct. This condition occurs as the result of the negative pulse received from tube V-9 on the 128th count. If the light beam is interrupted after the 128th count is reached, a pulse will be produced by the trigger circuit which will be applied in the usual manner to tube V-3, causing it to indicate a count of one. This pulse, however, can not change the indication of the last stage through the operation of the binary counter. Therefore a smaller pulse is also applied through capacitor C27 in series with resistor R40 to the B grid of V-10. The positive part of the pulse has no effect as the B section is conducting. However, the negative pulse causes diminution of the current in the B half, and reversal of the V-10 stage, just as if a second pulse had been received from V-9. This reverses the action of V-10 (A section conducting B section in cut-off state). The resulting indicator action is described in the next section.

Except as a result of the 128th count, the A half of V-10 is conducting and the B half is in a cut-off state. The positive pulses from C27 which are applied during each count to the B grid of V-10 are too small to cause a rise above the cut-off level. The negative pulses will have no effect since this half is in a cut-off state. For this reason nothing happens to V-10 as a result of the pulses before the 128th pulse reverses the conducting and cut-off positions. However, if a pulse does occur after the 128th count and the B section is conducting, then the negative pulse from the capacitor C27 applied to the grid of the B section causes the B section to stop conducting and the A section to conduct.

When each count is begun, the reset relay R opens its contact 1 momentarily disconnecting the cathode of each half of the binary tubes that should be in a cut-off state. Since the correct count for a packet is not 128 but 102 (100 bills plus 2 wrapping sheets), the reset relay is so connected that the configuration of the binary stages is the one that appears at the conut of 26. The 102 additional counts then produce the effect of the 128th count.

The indicator stage, V-11, is controlled by a Schmitt-type trigger circuit of the same type as V-2. Ordinarily the A section is conducting and the B half is in a cut-off state. When the A grid of tube V-10 goes negative as a result of the correct (128) count, the A grid of tube V-11, being connected to grid A of tube V-10 through resistor R24, goes negative. The result is that the A section goes to a cut-off condition and B section now conducts. As the current flows through the B section the indicator relay IR is energized as will be described in connection with Figure 12. This closes a contact in the indicator vane circuit; its action is described in the indicator portion of the section on "Operation of the control circuit." As explained therein, the indicator vane tilts as a result of a correct count, and allows the packet to fall into the "Correct" chute. If a count occurs after the correct count and the B section of V-10 is made non-conducting, the A half of V-11 conducts and the B half comes to a cut-off state. As the current ceases to flow through the B section of the tube V-11, and hence, through the indicator relay coil, the coil opens the contact and the vane will not be allowed to tilt.

*Operation of the control circuit*

Under initial conditions the limit switch SL-1 is closed. When the main power switch SW-1 is closed, current passes through the constant voltage transformer CVT and energizes the exciter lamp, the electronic circuits, and the D.-C. power supply. Operation of the ready button RB energizes the relay B which maintans itself through its contact and connects the power supply to the control circuit and the air compressor motor CM. If the selector switch AM is in the automatic position, that is, closed, the following sequence of events occurs.

When a strap is present in the input trough closing the strap switch TS and the turntable is in the starting position closing limit switch SL-2, the feeder solenoid FM is energized through contact 1 of motor relay MR, limit switch SL-2 and the snarl switch SS. The feeder mechanism is actuated and a strap is presented to the jaws 31 and 32. As the strap is pushed toward the jaws the feeder switch FS is closed and the relay L is energized. This relay closes its contact 1 and opens its contact 2. The closed contact maintains relay L through switch SL-1 and energizes the motor relay MR and the timing relay TR2A through contact 1 of relay TR2. The opening of contact L-2 deenergizes the relay LA which, however, is maintained for several seconds by the discharge of condenser C1 through resistors R57 and R10 and relay LA. The reason for this will be explained further on in the discussion.

The energization of relay MR closes its contact 2 and opens its contacts 1 and 3. The opening of contact 3 and closing of contact 2 disconnects the turntable motor TM from the D.-C. braking voltage, supplied by 6.3-volt transformer secondary TS-1 shown in Figure 11 and the rectifier 113, and transfers it to the power line. The opening of contact 1 deenergizes the feeder solenoid circuit allowing the feeder mechanism to return, thus opening the feeder switch.

The relay TR2A, which was energized immediately upon the closing of the contact 1 of the relay L, closes its two contacts 1 and 2, contact 2 being in the circuit of the counter relays CR1 and CR2 and contact 1 being in the clamp solenoid CS circuit. The clamp solenoid and the motor are both energized at the same time, but since the solenoid has low inertia, the jaws will clamp the strap before the turntable motor starts to turn.

During the first revolution of the motor the strap is wrapped around the jaws 31 and 32. About halfway through this revolution the capacitor C1 has become sufficiently discharged to deenergize the relay LA. This closes the LA contact and energizes timing relays TR1 and TR2. These relays are time delay relays which are controlled by synchronous clocks. Therefore upon the closing of the LA contact the clocks are energized but the contacts are not affected immediately. After a short delay, and prior to the completion of the first revolution, the contacts of relay TR1 are actuated. This closes the TR1 contacts in the CR1 and CR2 circuit thereby energizing these relays. The CR2 contact 1 energizes the timing relay TR2B which closes its contact 1 to short-circuit the contacts of the switch SL1. This contact must close before SL1 contacts are opened by rotation of the turntable in order to maintain the relay L. The switch SL1 is opened just prior to the end of each complete revolution for reasons to be explained later. The closing of contact 1 of the CR2 relay also momentarily energizes the reset relay R by connecting its coil to the 325-volt D.-C. line through capacitor C5 and resistor R5. This allows the transient charging current of capacitor C5 to flow. The reset relay breaks the 165-volt line to certain binary cathodes which have been selected to obtain the preset count of 26. The opening of contact 2 of the TR2B relay deenergizes the air escape valve AR and allows a flow of air to air hose 63 for purposes already explained. Contact 2 of CR2 removes the effect of a by-pass capacitor, C3, on the trigger circuit as previously described. The energization of CR1 through the operation of its contact 1 transfers the coil of the indicator relay IR to the output circuit of the indicator tube V-11B. This will cause the vane to swing back to the reset position if the previous count had been correct. The closing of contact 2 of CR1 short-circuits the TR2A contact in the clamp magnet circuit for reasons to be explained later.

Thus far a strap has been fed to the jaws, the jaws clamped, the turntable motor energized, the turntable has made one complete revolution, and the counting circuits have been readied for counting.

During the next revolution the bills are counted. The count concludes and one of three conditions occurs: the count is deficient, correct, or over the correct amount. A deficient count produces no indicator action, a correct count energizes the indicator relay through the output of the indicator tube V-11. The actuation of the indicator relay IR energizes the sorter solenoid SM through IR contact 1 and closes the IR contact 2 in the indicator holding circuit. If the count is too large the correct indication is reversed before the vane has had time to tilt.

Toward the end of the second revolution when the count is completed, the timing relay TR2 is actuated by its synchronous clock. This opens the TR2 contact in the TR2A circuit and deenergizes this relay. The TR2A contact 1 opens in the clamp solenoid circuit which, however, is maintained for an instant more through contact 2 of the CR1 relay. Contact 2 of TR2A opens the counting relay circuit which deenergizes CR1 and CR2. The deenergization of the counting relays opens contact 1 of CR2 and disconnects the reset relay R which allows the capacitor C5 to discharge through resistor R3 preparing this circuit for the next counting cycle. Also contact 2 of CR2 short-circuits the counter by grounding capacitor C3. The opening of contact 1 of CR2 also removes the power from the TR2B circuit. After a delay determined by the discharge time of capacitor C34 through resistors R59 and R58, and the coil of TR2B, TR2B opens its contact 1 in the holding circuit of relay L. The time delay provided by C34 is necessary to maintain the short circuit of SL1 since this switch is opened momentarily toward the end of each revolution. Contact 1 of TR2B opens after SL1 has been reclosed at the beginning of the third revolution. The contact 2 of TR2B energizes the air escape valve solenoid AR, shutting off the flow of air to the hose 63.

The deenergization of the counting relays also transfers the indicator relay IR from tube V-11 to its holding circuit which is through contact 2 of the indicator relay and resistor R1. During this transfer, the relay is maintained by the discharge of capacitor C2 through the relay coil. Further the deenergization of CR1 opens the circuit to the clamp solenoid CS. It is necessary to have contact 1 of TR2A shunted by contact 2 of CR1 because the time sequence of the machine is such that if only TR2A acted to deenergize the clamp solenoid and release the strap, the end of the strap might pass through the light beam before the CR1 relay had short-circuited the counter and thereby produce an incorrect count. However, with contact 2 of CR1 in the clamp solenoid circuit the strap is not released until the counter is short-circuited.

The turntable continues through one more revolution during which the strap is ejected. The rotation continues until SL1 is opened toward the end of the third revolution. Since contact 1 of TR2B is already open the opening of SL1 deenergizes relay L which opens contact 1 and closes contact 2. The opening of contact 1 deenergizes the motor relay which causes direct current to be applied to the turntable motor and closes a contact in the feeder solenoid circuit, the turntable coasts, being retarded by the direct current, to the feeding position which actuates SL2. This applies power through the now closed MR contact 1 and the snarl switch SS to the feeder solenoid FM and starts the next cycle.

Prior to this, however, when the relay L was deenergized it closed contact 2 in the LA circuit. This caused LA to be energized and to open its contact in the TR1 and TR2 circuit causing these two relays to be deenergized. Since these relays are delayed by a clock mechanism it requires some time for them to return to their starting condition. This is the reason for the time delay in the LA relay circuit. The elapsed time from the deenergization of L by opening of SL1 and the reenergization of L if a new cycle starts is only a fraction of a second. Therefore if the operation of LA were not delayed the clock mechanisms in TR1 and TR2 would be energized before they had returned to their starting positions, and these relays would operate at incorrect times during the next cycle of operation. Therefore the operation of LA is delayed to allow the clocks in TR1 and TR2 to return to starting position.

If the AM switch is set to manual, depressing the manual start switch MS has the same effect as actuating the feeder switch with a packet in position; that is, it initiates the cycle by energizing the relay L.

If at any time it is necessary to stop the operation of the machine without it being necessary to completely shut the counter off, the stop push button SB may be actuated. This will open the circuit to the relay B which will stop the compressor motor CM and disconnect the relay and solenoid circuits from the power source.

Figures 9, 10:
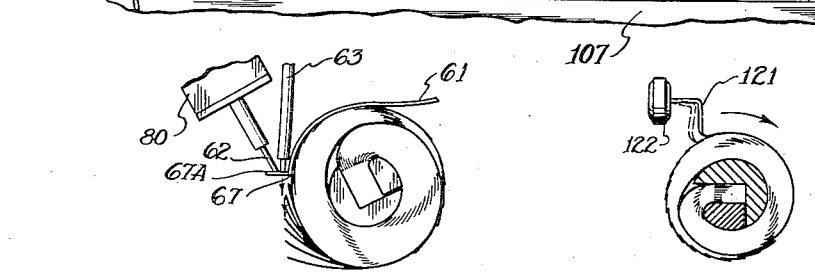
Figure 9 is a detailed view of the knife edge assembly.
Figure 10 shows an alternative method of counting the bills.

In Figure 10 is shown a modification of the counting system in which the phototube assembly is eliminated. A crystal pickup stylus 121 is located just at the end of the friction band 61. As each note passes the stylus the stylus is moved, causing the crystal 122 to send out a voltage pulse. This is fed to the tube V-1 in the same manner as the pulses from the phototube V-0. The use of the photoelectric assembly is preferred, however, to the crystal pickup assembly because the mechanical inertia of the stylus limits the rate at which accurate counting may be done.

It will be apparent that the embodiments shown are only exemplary and that various modifications can be made in construction and arrangement within the scope of our invention as defined in the appended claims.

We claim:

1. A machine for determining the correctness of the number of bills in a strap, comprising clamping means for said strap, means for rotating said clamping means, means for wrapping said strap around said clamping means, means for successively releasing one end of the bills in said strap, means for producing a beam of light, light-sensitive means so positioned in the path of said beam of light that the released bills interrupt said beam of light, means connected to said light-sensitive means for producing an electric pulse due to each of said interruptions, means for counting said electric pulses, a correct-chute and a reject-chute means for releasing said strap to said chutes, and means for comparing the count registered by said means for counting with a predetermined correct count, and sorting means actuated by said last-mentioned means for depositing said strap in the appropriate chute.

2. A machine for determining the correctness of the number of bills in a strap comprising means for holding a number of straps, feeding means for said straps, turntable means, clamping means on said turntable means for clamping one end of straps presented by said feeding means, means for rotating said turntable means, means for wrapping the clamped strap around the clamping means to offset stepwise the free ends of the bills of said clamped strap, means for successively releasing the offset ends of the bills, means for directing a stream of air against the released bills, means for producing a sharply defined beam of light, photoelectric means positioned in the path of said beam of light, said last two mentioned means being so positioned that the beam of light is interrupted by the released bills, means controlled by said photoelectric means for producing an electric pulse in response to each of said interruptions, counting means for tabulating the number of said interruptions.

3. A machine for counting the number of bills in a strap comprising trough means for holding a number of straps, feeding means for said straps, turntable means for rotating said straps, clamping means on said turntable means for clamping straps presented to said clamping means by said feeding means, means for initiating rotation of said turntable means subsequent to the clamping of said strap, friction band means for wrapping the clamped strap around the clamping means during the first revolution of said turntable to offset stepwise the free ends of said bills in said strap, knife-edge means for successively releasing the offset ends of the individual bills during the second rotation of said turntable, hose means for directing a stream of air against the released bills for quickly separating the released bills from the remainder of said strap, means for producing a sharply defined beam of light, light-sensitive means positioned in the path of said beam of light, said last two mentioned means being so positioned that the beam of light is completely interrupted by the released bills, means controlled by said light-sensitive means for producing an electric pulse upon each of said interruptions, counting means for tabulating the number of said interruptions, sorting means positioned by said counting means in accordance with the results of the count and means for opening said clamping means subsequent to the positioning of said sorting means.

4. A machine for automatically counting the number of bills in a strap, comprising clamping means for said strap, means for rotating said clamping means, means for wrapping said strap around said clamping means, means for successively releasing the bills in said strap, said last-mentioned means comprising a stylus and a crystal actuated by said stylus for producing electrical pulses as each bill is released, counting means coupled to said releasing means for tabulating the number of pulses, and indicator means coupled to said counting means for indicating a count.

5. A machine for determining the correctness of the number of bills in a strap, comprising clamping means for said strap, means for rotating said clamping means, means for wrapping said strap around said clamping means, means for successively releasing the bills in said strap, said last-mentioned means comprising a stylus and a crystal actuated by said stylus for producing electrical pulses as each bill is released, counting means for tabulating the number of pulses, a correct-chute and a reject-chute and means for comparing the number of bills in said strap with a predetermined correct number, and sorting means actuated by said last-mentioned means for depositing said strap in the appropriate chute.

6. A machine for determining the number of sheets in a packet, comprising a first means for counting the sheets in said packet, a correct-chute and a reject-chute, a second means for comparing said count with a predetermined number, sorting means initially positioned to deposit said packet in said reject-chute, means responsive to said second means to position said sorting means to deposit said packet in said correct-chute when said second means indicates that the count agrees with said predetermined number, and means for presenting said packet to said sorting means.

7. A machine for automatically counting sheets of material in a packet, comprising means for separately and successively releasing one end of said sheets, means for producing an electrical pulse for each released sheet, a counter having a definite number of counting stages, said counter being responsive to said pulses to increase the count on said counter on receiving each pulse, the number of stages in said counter determining the highest count that can be indicated by said counter, means coupled to said counter for setting said counter to a predetermined count before initiation of the counting cycle, means responsive to actuation for a predetermined interval of the last stage of said counter to produce a control function, sorting means responsive to the control function for sorting the packet and means for presenting said packet to said sorting means after termination of said count.

8. A machine for counting the sheets of material in a packet, comprising means for riffling the packet to release the sheets separately and successively, a beam of light, light-sensitive means positioned in the path of said beam of light for producing an output signal when the intensity of said light beam varies, said light-sensitive means so positioned that said released sheets vary the intensity of said beam of light, counting means coupled to said light-sensitive means for tabulating the number of output signals from said light-sensitive means; means for setting up a predetermined count condition, and means for determining when the count reached by said counting means is equal to the predetermined condition.

9. The invention according to claim 8 in which there is provided means responsive to said last-mentioned means for indicating when the count is equal to the predetermined number.

10. A machine for counting the sheets of material in a packet, comprising means for riffling the packet to release the sheets separately and successively, means for counting the released sheets, means, including means for directing a stream of air against the released sheets, for positively presenting the released sheets to said counting means, means for establishing a predetermined count condition, and means for comparing the count registered by said means for counting with the predetermined condition.

11. A machine for counting the sheets of material in a packet comprising clamping means for said packet, means for rotating said clamping means, means in juxtaposition with said clamping means for wrapping said packet around said clamping means, means including said rotating means for successively releasing the sheets from the wrapped-around position, means for registering a count of the released sheets, means for establishing a predetermined physical condition representative of a count number and means for comparing the registration of said count with said condition.

12. A machine for determining the correctness of the number of bills in a strap comprising means for riffling the strap so as to release the bills separately and successively, means for counting the released bills, a correct-chute and a reject-chute, means for releasing said strap to said chutes, means for automatically comparing the count registered by said means for counting with a predetermined correct count, and sorting means actuated by said last-mentioned means for depositing said strap in the appropriate chute.

13. The invention according to claim 12 in which the means for counting comprises means for producing a beam of light, light-sensitive means in the path of said beam of light for producing an output signal when the intensity of said beam of light is varied, said light-sensitive means being so positioned that said released bills interrupt said beam of light, means responsive to the output signal from said light-sensitive means for producing an electric pulse in response to each of said interruptions, and means responsive to said pulses for tabulating the number of said interruptions.

References Cited in the file of this patent

UNITED STATES PATENTS

| | | |
|---|---|---|
| 1,328,263 | Buckley et al. | Jan. 20, 1920 |
| 2,020,925 | Young | Nov. 12, 1935 |
| 2,087,039 | McMaster | July 13, 1937 |
| 2,122,710 | Bidwell | July 5, 1938 |
| 2,271,394 | Hayes | Jan. 27, 1942 |
| 2,425,318 | Hayes | Aug. 12, 1947 |
| 2,429,159 | Hayes | Oct. 14, 1947 |
| 2,617,526 | La Pointe | Nov. 11, 1952 |
| 2,660,304 | Box et al. | Nov. 24, 1953 |
| 2,690,257 | Schmied | Sept. 28, 1954 |
| 2,717,693 | Holmes | Sept. 13, 1955 |

FOREIGN PATENTS

| | | |
|---|---|---|
| 239,888 | Germany | Oct. 23, 1911 |
| 424,917 | Germany | Feb. 8, 1926 |
| 468,276 | Germany | Oct. 19, 1929 |
| 557,086 | Great Britain | Nov. 3, 1943 |